United States Patent
Gugel (10) Patent No.: US 7,355,789 B2
(45) Date of Patent: Apr. 8, 2008

(54) PHASE FILTER

(75) Inventor: Hilmar Gugel, Dossenheim (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 227 days.

(21) Appl. No.: 11/176,128

(22) Filed: Jul. 7, 2005

(65) Prior Publication Data
US 2006/0007535 A1    Jan. 12, 2006

(30) Foreign Application Priority Data
Jul. 7, 2004    (DE) ................ 10 2004 032 953

(51) Int. Cl.
  G02B 21/00    (2006.01)
  G02B 27/28    (2006.01)
(52) U.S. Cl. ................ 359/368; 359/496; 359/518
(58) Field of Classification Search ........ 359/368–390, 359/483–502, 618–636, 577–590
See application file for complete search history.

(56) References Cited

U.S. PATENT DOCUMENTS

| | | | |
|---|---|---|---|
| 3,646,608 A * | 2/1972 | Rowland ................ | 359/370 |
| 4,801,193 A | 1/1989 | Martin et al. ............ | 359/518 |
| 5,035,476 A * | 7/1991 | Ellis et al. ............... | 359/202 |
| 5,742,577 A | 4/1998 | Horimai et al. .......... | 359/496 |
| 6,891,670 B2 | 5/2005 | Gugel et al. ............. | 359/387 |
| 7,151,632 B2 * | 12/2006 | Biss et al. ............... | 359/371 |
| 2002/0104961 A1 | 8/2002 | Hoffman .................. | 250/234 |
| 2004/0017572 A1 | 1/2004 | Anafi et al. .............. | 356/445 |

FOREIGN PATENT DOCUMENTS

| | | |
|---|---|---|
| DE | 3532416 | 3/1987 |
| DE | 101 07 095 A1 | 8/2002 |
| DE | 10105391 | 8/2002 |
| GB | 2180368 | 3/1987 |

OTHER PUBLICATIONS

Khonina, S. et al, "Gauss-Laguerre modes with different indices in prescribed diffraction orders of a diffractive phase element" Optics Communications, Mar. 2000, vol. 175, Num. 4-3, pp. 301-308, North-Holland Publishing Co., Amsterdam, Netherlands.

Watanabe, T., et al., "Two-point-separation in super-resolution fluorescence microscope based on up-conversion fluorescence depletion technique," Optics Express, Dec. 2003, vol. 11, No. 24, pp. 3271-3276.

* cited by examiner

*Primary Examiner*—Thong Q Nguyen
(74) *Attorney, Agent, or Firm*—Houston Eliseeva LLP (57) ABSTRACT

An optical device with a focusing optic that focuses a light beam in a focal plane and brings about a phase shift between a first part of the light beam and a second part of the light beam. The optical device has a first interface and a second interface, the first interface reflects the first part of the light beam, and the second interface reflects the second part of the light beam.

31 Claims, 7 Drawing Sheets

PHASE FILTER

RELATED APPLICATIONS

This application claims priority to German Application No. DE 10 2004 032 953.2 filed on Jul. 7, 2004 which is incorporated herein by reference in its entirety.

BACKGROUND OF THE INVENTION

The invention relates to an optical device with a focusing optic that focuses a light beam in a focal plane, and with a means of forming the focus of the light beam, whereby the means of forming a focus causes a phase shift between a first part of the light beam and a second part of the light beam.

The invention furthermore relates to a scanning microscope with a focusing optic that focuses a light beam in a focal plane, and with a means of forming the focus of the light beam, whereby the means of forming the focus of causes a phase shift between a first part of the light beam and a second part of the light beam.

The invention furthermore relates to a phase filter that brings about a phase shift between a first part of a light beam and a second part of a light beam.

In scanning microscopy, a sample is illuminated with a light beam in order to observe the reflection light or fluorescent light emitted by the sample. The focus of the illumination light beam is moved in an object plane with the help of a controllable beam deflector, generally by tipping two mirrors, whereby the axes of deflection are mostly positioned perpendicular to each other so that one mirror deflects in the x-direction and the other in the y-direction. The mirrors can, for example, be tipped with the help of galvanometric positioners. Measurement of the power of the light coming from the object is dependent on the position of the scanning beam. Usually, the positioners are equipped with sensors that determine the current position of the mirrors. In addition to these so-called beam-scanning methods, scanning microscopes with spatially fixed illumination light beams are also known, in which the sample is scanned with the help of a fine-positioning stage. Such scanning microscopes are referred to as object-scanning microscopes.

In confocal scanning microscopy in particular, an object is scanned in three dimensions with the focus of a light beam.

A confocal scanning microscope generally comprises a light source, a focusing optic with which the light from the source is focused on a pinhole aperture—the so-called excitation aperture—, a beam splitter, a beam deflector to control the beam, a microscope optic, a detection aperture, and detectors to detect the detection light or fluorescent light. The illumination light is coupled via a beam splitter. The fluorescent light or reflection light coming from the object returns to the beam splitter via the beam reflector, passes this, and is subsequently focused on the detection aperture, behind which the detectors are located. Detection light that does not originate directly from the focal region takes another light path and does not pass through the detection aperture so that one obtains point information by which a three-dimensional image is constructed by sequential scanning of the object. In most cases, a three-dimensional image is achieved by layered imaging.

The power of the light coming from the object is measured at set intervals during the scanning process so that it is scanned pixel by pixel. Each reading must be definitively assigned to the corresponding scanning position so that an image can be created from the measured data. Advantageously, the status data of the beam deflector positioners are measured continually, or the target control data from the beam deflector are used directly, which is, however, not as precise.

It is also possible to detect, for example, the fluorescent light or the transmission of the excitation light from the condenser in a transillumination configuration. The detection light beam then does not reach the detector via the scanning mirror (non-descanning configuration). In the transillumination configuration, a detection aperture at the condenser would be necessary to detect fluorescent light in order to achieve three-dimensional resolution as in the described descanning configuration. In the case of two-photon excitation, one can forgo the detection aperture at the condenser because the excitation probability is dependent on the square of the photon density (proportional to the intensity squared), which is naturally much higher in the focal region than in neighboring regions. The detectable fluorescent light therefore originates almost entirely and with great certainty from the focal region, which makes it superfluous to differentiate fluorescent photons from the focal region from fluorescent photons from the neighboring regions using an aperture arrangement.

The resolution of a confocal scanning microscope is, among other things, dependent on the intensity distribution and the spatial spread of the focus of the excitation light beam. An arrangement to increase the resolution for fluorescent uses is known from PCT/DE/95/00124. Here, the lateral marginal regions of the focal volume of the excitation light beam are illuminated with a light beam of another wavelength—the so-called stimulation light beam, which is emitted by a second laser—in order to return the sample regions excited by the light from the first laser to their ground state stimulated. What is then detected is only the spontaneously emitted light from the regions that were not illuminated by the second laser, so that an overall improvement in resolution is achieved. This method has come to be known as STED (Stimulated Emission Depletion).

A new development has demonstrated that one can achieve both lateral and axial improvements in resolution if one succeeds in hollowing the inside of the focus of the stimulation light beam. To this end, a phase filter that contains a round $\lambda/2$ plate that is smaller in diameter than the diameter of the beam is introduced into the beam path of the stimulation light beam and is over-illuminated as a result. The form of the stimulation focus results from the Fourier transforms of the phase filter function.

Currently in STED microscopy, a sample is illuminated with a shortwave laser pulse which, for example, comes from a pulsed laser diode. Then, a longwave laser pulse, which has a high intensity, causes a de-excitation of the fluorescent molecules at the margin of the excitation focus. In order to minimize as much as possible the photodamaging effect of the longwave pulse, it should have a pulse width in the range of approximately 100 ps or longer. This longwave laser pulse can, for example, be emitted by a second laser diode that already has the appropriate pulse width, or it may be generated by broadening the pulse of a short longwave laser pulse. A pulse can be most easily broadened by a two-step process. First, the short pulse passes through a glass rod, which stretches it to a pulse width of several picoseconds. After that, the laser pulse passes through a long glass fiber in which it is broadened further. A glass rod can also be replaced by a glass body in which the pulse is multiply reflected by total reflection and therefore travels a long distance within the glass body. Another way of stretching the laser pulse is to use diffraction grating.

In order to de-excite the fluorescence molecules at the focal margin, the de-excitation point spread function must be specially formed. To this end, phase filters are used that are located in the beam path of the longwave laser beam. They change the wave front of the de-excitation beam depending on where it is located. Phase filters are currently manufactured by applying a transparent structure (e.g., magnesium fluoride) to a glass substrate. The light that penetrates the structure and the glass substrate experiences a phase delay in comparison to the light that only penetrates the substrate that is dependent on the thickness of the structure and the wavelength of the light. When using different wavelengths, as is, for example, the case when using different fluorescent dyes, a different phase filter must be used for each wavelength. The disadvantage is that when using a broad wavelength spectrum to de-excite, as is the case when broadening the pulse in a glass fiber or when using photonic crystal fibers (photonic bandgap fibers), the phase shift through the phase filters is not identical for all wavelengths in the selected wavelength range. This leads to a de-excitation point spread function (PSF) that is not ideal, and generally as a result to an undesirable reduction in fluorescence in the sharp maximum of the high-resolution PSF at the location of the geometric focus.

Phase filters are used in numerous procedures requiring increased resolution. This is particularly true for STED-, STED-4-pi-, and up-conversion-depletion microscopy. The phase filters change the phase of the wave front, penetrating them dependent on location. The standard method of manufacturing these phase filters is to apply structures to a glass substrate so that the wave front passing through experiences a location-dependent phase delay via the beam diameter. Because of this phase filter design, the phase shift that is generated is dependent on the wavelength of the light. However, this is generally not desirable because a different phase filter is needed for each wavelength used.

A scanning microscope that optically measures a sample point of a sample with high local resolution, with a light source to emit an excitation light beam adequate to excite an energy state in the sample, a detector to detect emission light, and a stimulation light beam emitted by a light source to generate stimulated emission in the sample point of the sample excited by the excitation light beam is known from DE 101 05 391 A1. The excitation light beam and the stimulation light beam are arranged such that their intensity distributions partially overlap each other in the focal region. The scanning microscope is characterized in that the optical elements that form the stimulation light beam are comprised into at least one module that can be positioned in the beam path of the scanning microscope. In one embodiment of the invention, means to influence the form of the focus of the stimulation light beam are envisaged.

A method similar to STED microscopy to increase resolution is known from T. Watanabe et. al., "Two-point-separation in super-resolution fluorescence microscope based on up-conversion fluorescence depletion technique," 2003, Optics Express, Vol. 11, No. 24, 1 Dec. 2003. In so-called up-conversion-depletion microscopy, the excited state is not stimulated to de-excite as in the STED microscope; rather a further excitation into another state is brought about.

SUMMARY OF THE INVENTION

The task underlying the invention is to declare an optical device that enables focus formation that is largely independent of wavelength.

This task is solved by an optical device characterized in that the means for forming the focus exhibits a first interface and a second interface, whereby the first interface reflects the first part of the light beam and the second interface the second part of the light beam.

A further task underlying the invention is to declare a scanning microscope, in particular one that optically measures a sample point of a sample with high local resolution that enables focus formation that is largely independent of wavelength.

This task is solved by a scanning microscope characterized in that the means for forming the focus exhibits a first interface and a second interface, whereby the first interface reflects the first part of the light beam and the second interface the second part of the light beam.

A further task underlying the invention is to declare a phase filter that is largely independent of wavelength.

This task is solved by a phase filter characterized in that the phase filter exhibits a first interface and a second interface, whereby the first interface reflects the first part of the light beam and the second interface the second part of the light beam.

The fact that under certain circumstances light waves experience a phase shift when reflected by interfaces was recognized and exploited, according to the invention. This phase shift is primarily dependent on the breaking indexes of the materials on the interface, as well as on the angle of reflection. This dependence on the breaking index of the wavelength brings about a dependence on the phase shift of the wavelength. However, if the materials used are suitably selected, this dependence is very small. Consequently, a phase shift that is largely independent of wavelength can be generated by reflection at interfaces. By structuring at least one material at the interface, locally varying breaking index ratios are created via the beam diameter. This makes it possible to manufacture a phase filter that is largely independent of wavelength.

Preferably, the first interface is an interface between a first material and a second material, and the second interface is an interface between the first material and a third material.

In one particular embodiment, the reflection of the first and/or the second part of the light beam comprises a total reflection. Preferably, an angle of reflection $\alpha$ is selected in which the light that does not strike the metallic structure is reflected by total reflection at the interface so that no light is lost by the reflection.

An embodiment in which the second material is a coating on the first material is especially advantageous. In particular, the second material may contain a metal. An embodiment in which the second material comprises a metallic coating is particularly preferable.

Preferably, the first material consists of glass and/or transparent plastic and/or a crystal. The first material and/or the second material and/or the third material preferably exhibit low dispersion in order to keep wavelength dependence as low as possible.

The first material can, for example, form a three-dimensional geometric figure, in particular a prism or a rhomboid or a cuboid. Preferably, the light beam enters and/or exits the first material at an angle in the 90° range in order to avoid spatial spectral splitting.

In a preferred variant, one part of a surface of the three-dimensional geometrical figure borders the second material, and another part of the surface borders the third material.

For example, the third material can consist of a gas and/or a gas mixture, in particular of air.

The phase shift is preferably largely independent of the wavelength λ of the light beam and is preferably approximately λ/2 or λ/4. The light beam may exhibit several wavelengths. Preferably, the phase shift of each portion of the wavelength is λ/2 or λ/4.

Preferably, the light beam is s-polarized with regard to the reflection. The use of s-polarized light generally permits larger phase differences Δφ than does the use of p-polarized light. As a result, it is generally preferable to use s-polarized light rather than p-polarized light.

In a very preferred variant, the phase shift is adjustable by changing the angle of reflection. To this end, a rotational device to rotate or swivel the first material and/or the second material and/or the third material can, for example, be envisaged. It is also possible to change the direction of incidence of the light beam, for example with a tipping mirror arrangement.

Another possibility for implementing the phase filter consists of generating the phase shift by a multi-step process. To this end, the light is reflected several times by the interface before it leaves the first material. Further interfaces can be envisaged, in which case the further interfaces reflect the light beam or part of the light beam.

The structures and materials on each interface can be different. The structure on an interface may consist of different materials. It may also be advantageous to form the structure that generates the phase shift using microscopically small substructures of varying density. In this respect, the first material and/or the second material and/or the third material may exhibit a substructure.

The formed focus is preferably a hollow focus, or the focus exhibits an annular form. Such focus forms are particularly useful in microscopy.

The optical device according to the invention and/or the phase filter according to the invention are advantageous in scanning microscopy, particularly in STED microscopy or in up-conversion-depletion microscopy or in 4-pi microscopy. The phase filter according to the invention is particularly advantageous when used in phase-contrast microscopy.

Preferably, the scanning microscope according to the invention optically excites a sample in a sample region with an excitation light beam. In a preferred variant, the light beam that exhibits the formed focus generates a stimulated emission in the excited sample region or in a part of the excited sample region. In another variant, the light beam generates a further excitation of the sample, in particular a further excitation of already excited states, in the excited region of the sample or in a part of the excited region of the sample.

The scanning microscope is preferably a confocal scanning microscope, in particular a STED microscope or an up-conversion-depletion microscope or a 4-pi microscope (e.g., double confocal scanning microscope).

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. The object according to the invention is schematically depicted and described below based on the following figures. Of the drawings.

DETAILED DESCRIPTION OF THE PREFERRED EMBODIMENTS

Figure 1:
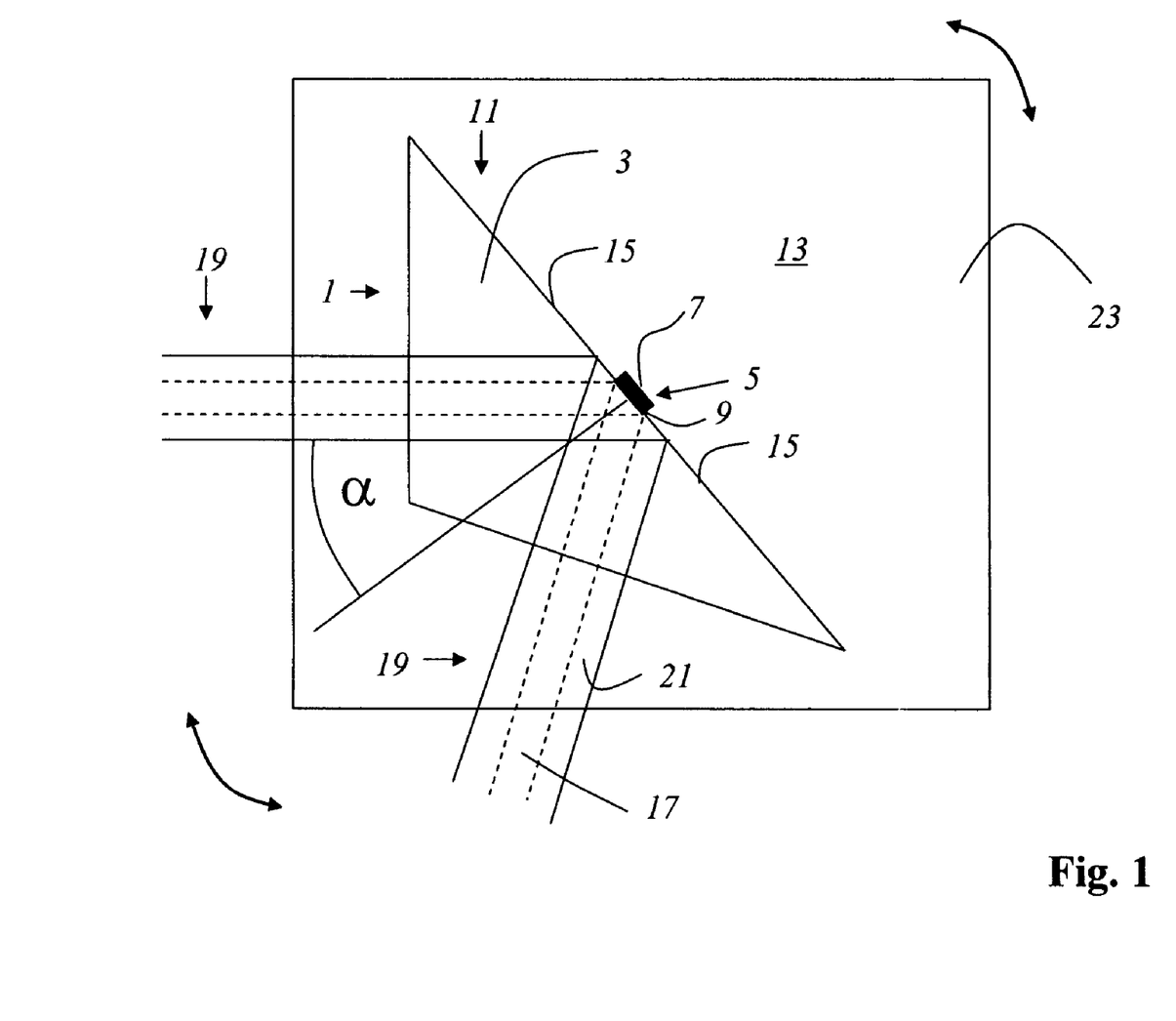
FIG. 1 a phase filter according to the invention.

FIG. 1 shows a phase filter according to the invention. The phase filter comprises a first material 1 that is formed as a glass prism 3. A second material 5 is vapor-deposited as a metallic coating on one part of a surface 11 of the glass prism 3. There is a first interface 9 between the metallic coating 7 and the glass prism 3. The non-coated part of surface 11 of the glass prism 3 forms a second interface 15 with a third material 13, namely the ambient air. A first part 17 of the light beam 19 that strikes the surface 11 of the glass prism is reflected by the first interface 9, while a second part 21 of the light beam 19 is reflected by the second interface 15 that surrounds the first interface 9. As a result of the varying breaking index transitions between glass and metal and glass and air at the first interface 9 and at the second interface 15, respectively, a location-dependent phase shift occurs via the beam diameter of the light beam 19. This phase shift is, among other things, dependent on the angle of incidence α of the light beam 19 on the surface 11. The phase filter depicted comprises a turntable 23 with which the glass prism 3, including its first interface 9 and its second interface 15, are rotated so that the angle of incidence α can be changed.

Figure 2:
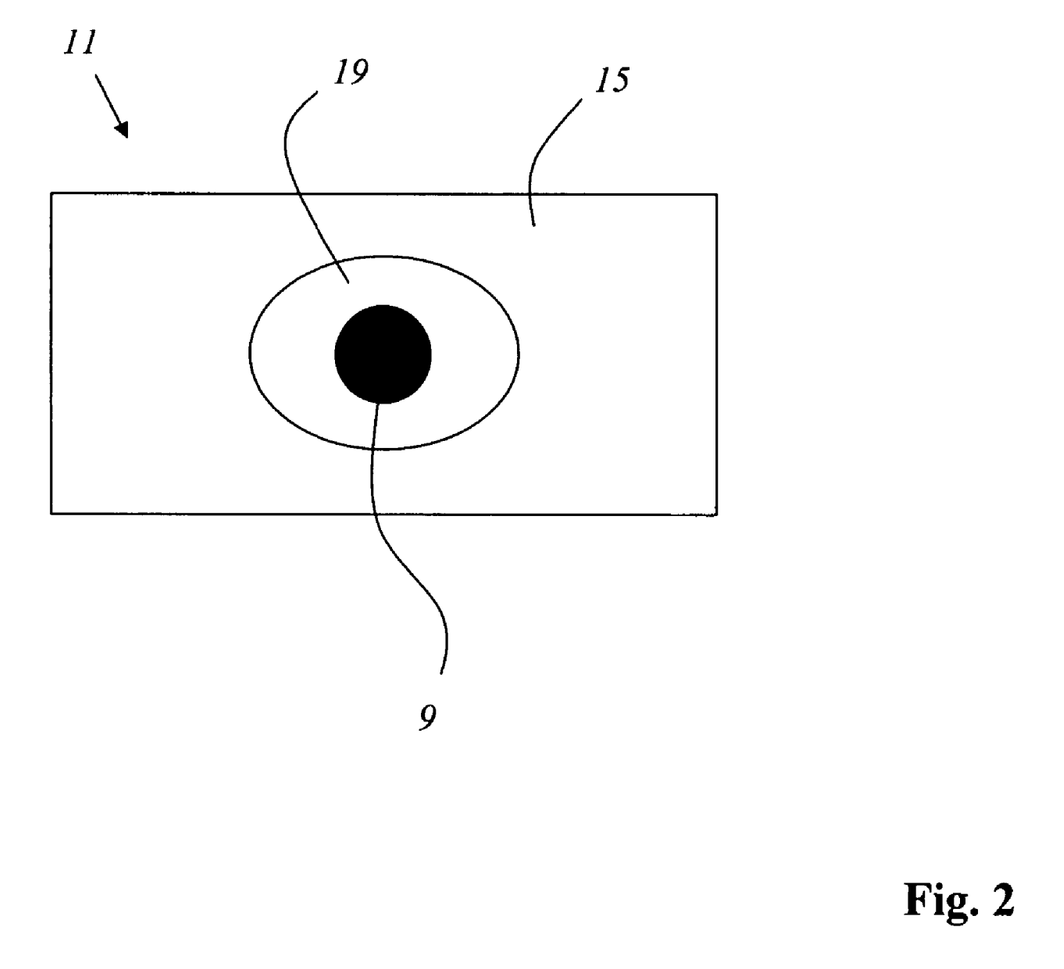
FIG. 2 interfaces of a phase filter according to the invention.

FIG. 2 shows the surface 11 of the glass prism 3 as well as the projection of the light beam 19 that strikes the surface. The first part 17 of the light beam 19 strikes the first interface 9, while the second part 21 of the light beam 19 strikes the second interface 15.

Figure 3:
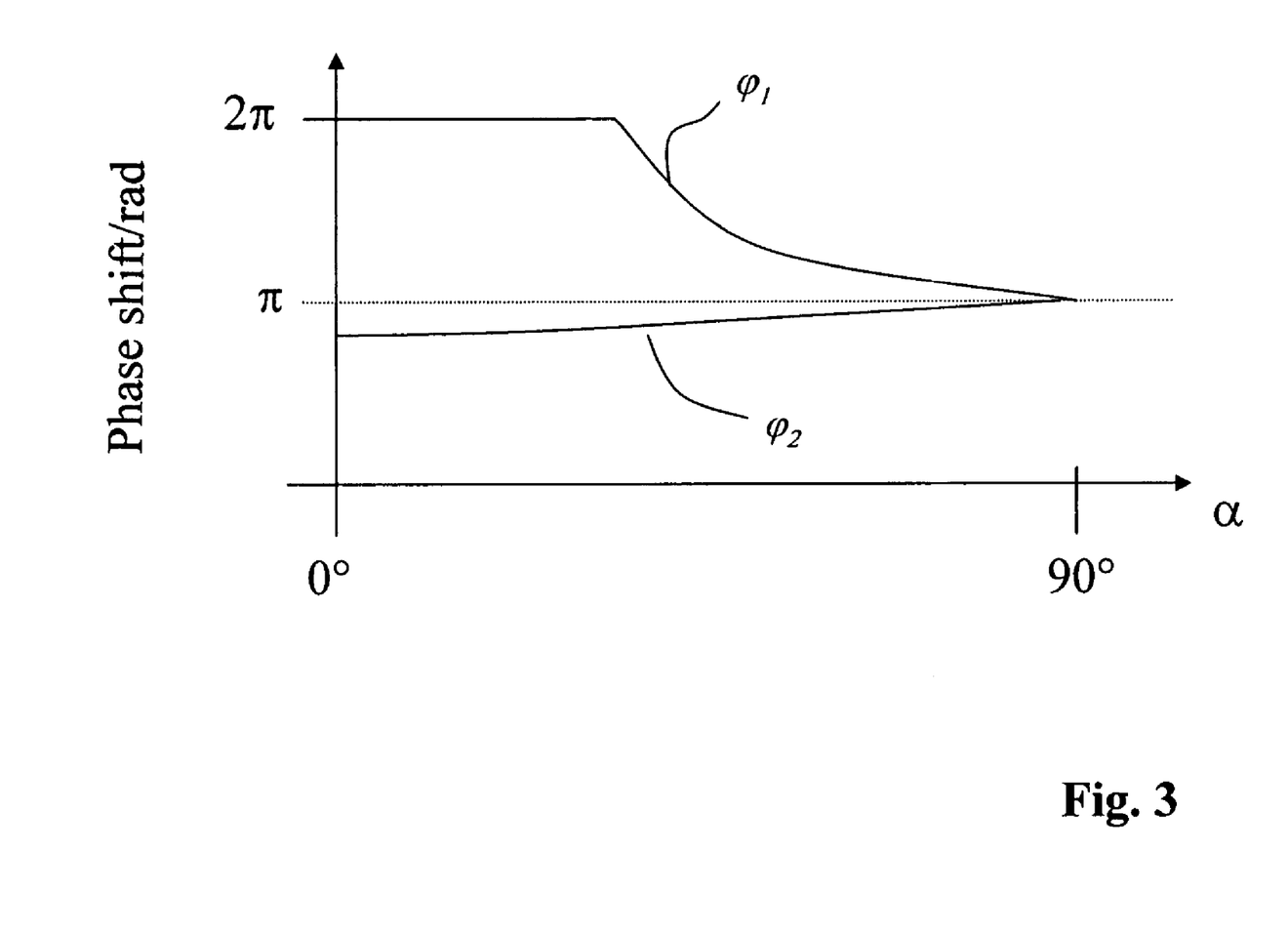
FIG. 3 the phase shift for s-polarized light.

FIG. 3 shows the phase shift $\phi_1$ for s-polarized light during internal reflection at the glass-air interface (second interface 15) and the phase shift $\phi_2$ for s-polarized light during internal reflection at the glass-metal interface (first interface 9) dependent on the angle of reflection α. The difference in the phase shift Δφ between the light waves that are reflected at the glass-air and glass-metal interfaces may be freely adjusted by selecting the angle of reflection a over a larger range. Preferably, an angle of reflection α is selected such that the light that does not strike the metallic structure is reflected by total reflection at the interface so that no light is lost during reflection.

Figure 4:
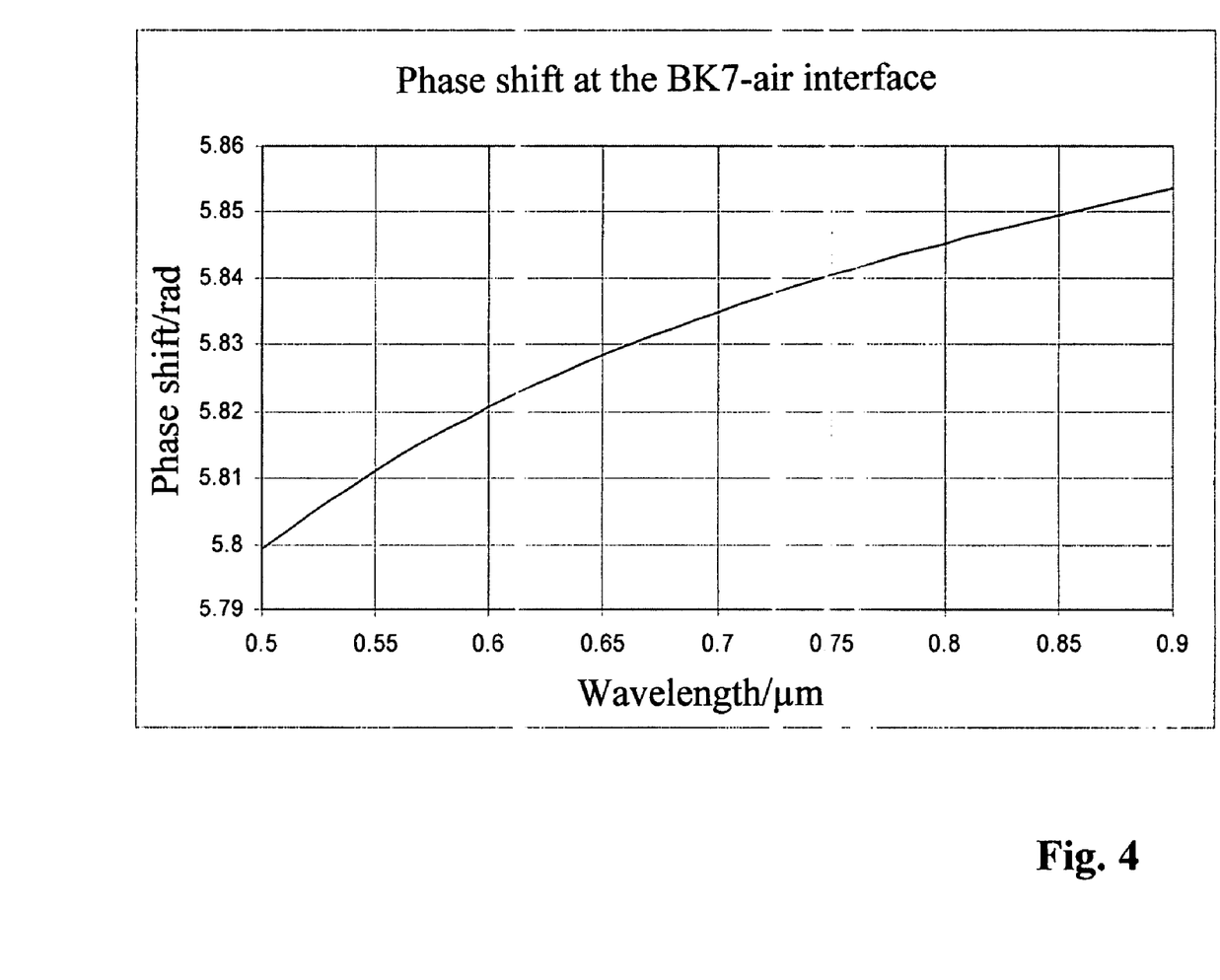
FIG. 4 the phase shift during total reflection for glass.

FIG. 4 shows the phase shift during total reflection for glass of the BK7 type, dependent on the wavelength. From the figure it is evident that the dependence of the phase shift on wavelength in a wavelength range of between 500 nm and 800 nm is only 0.05 rad, which is very small.

Figure 5:
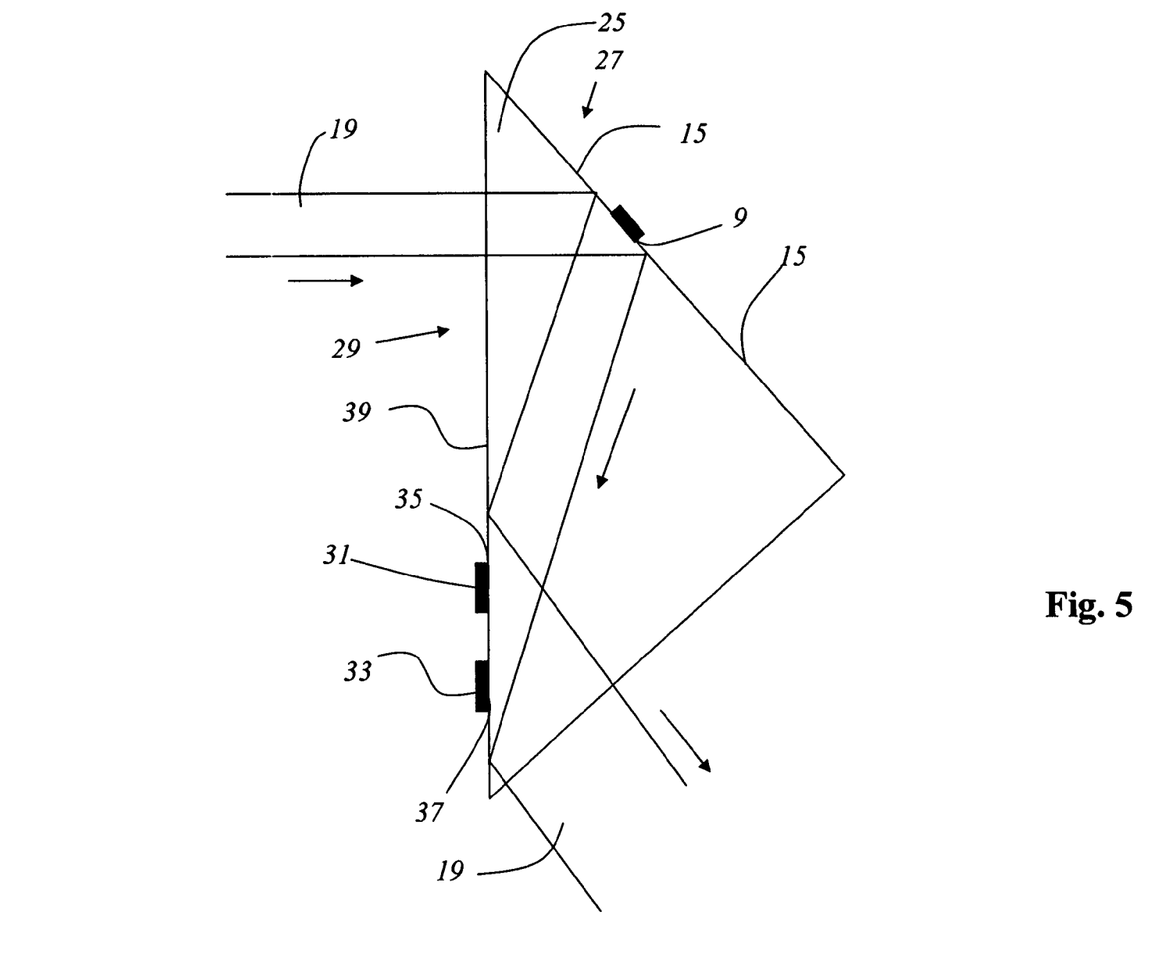
FIG. 5 another phase filter according to the invention.

FIG. 5 shows another phase filter according to the invention. The phase filter consists of a glass prism 25. The glass prism exhibits a first surface 27 with a first interface 9 and a second interface 15. The incident light beam 19 is reflected by the first surface 27 and reaches the second surface 29 that is coated with a fourth material 31 and a fifth material 33, each of which is a coating on the surface 29. The light beam 19 is reflected by the surface 29. The fourth material 31 forms a third interface 35 with the glass prism 25, and the fifth material 33 forms a fourth interface 37 with the glass prism 25. Interfaces 35, 37 are surrounded by a fifth interface 39, which is formed by the glass-air transition between the glass prism 25 and the ambient air. The phase shift within the light beam 19 is generated with this phase filter by a multi-step process, that is, by both reflections on surfaces 27 and 29.

Figure 6:
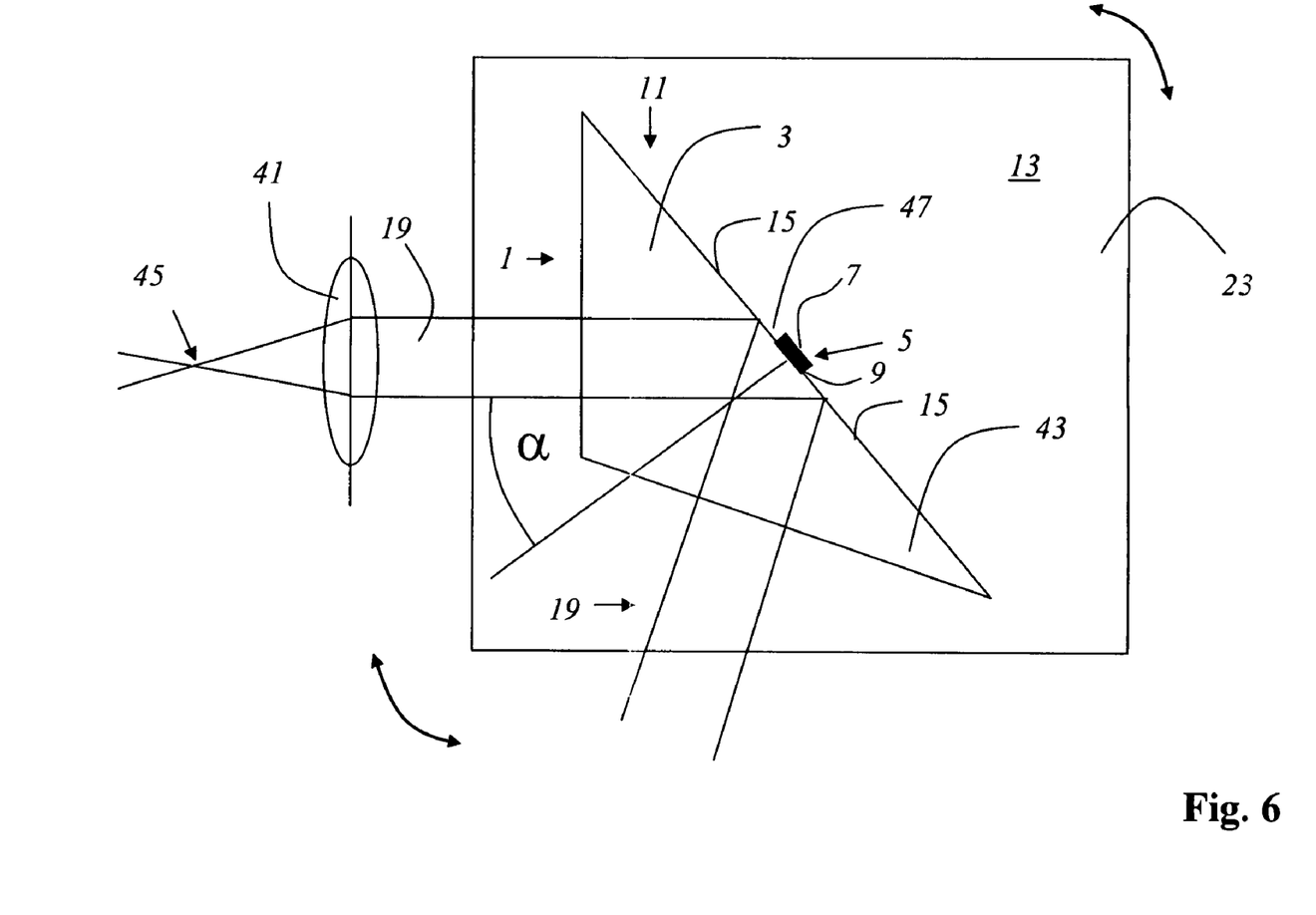
FIG. 6 an optical device according to the invention.

FIG. 6 shows an optical device according to the invention with a focusing optic 41 that focuses a light beam 19 with a means 43 to form the focus 45 of the light beam 19. The means to form the focus 45 largely comprises the phase filter depicted in FIG. 1, in which case the means 43 is arranged in the region of a Fourier plane 47 to the focal plane of the focusing optic 41. The form of the focus 45 results from the Fourier transforms of the phase shift by which the phase filter modulates the light beam 19.

Figure 7:
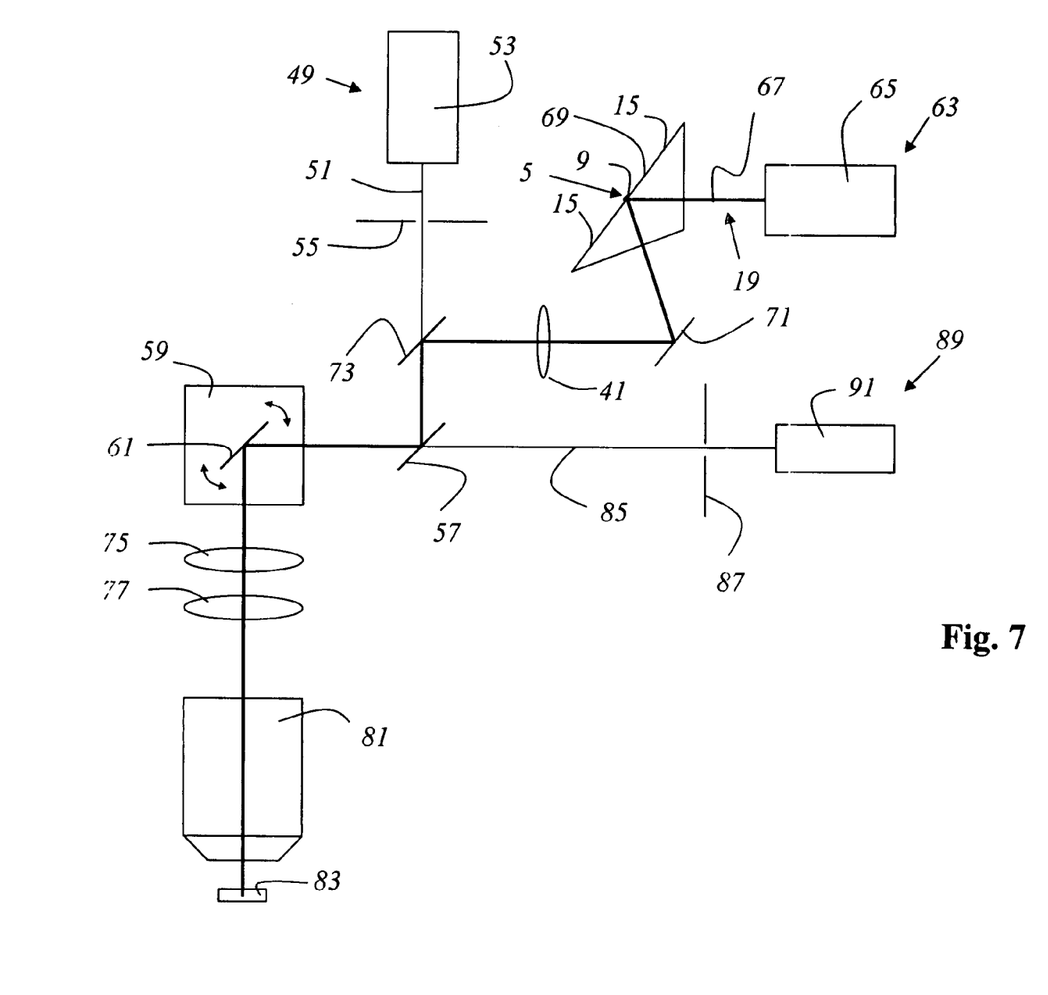
FIG. 7 a scanning microscope according to the invention.

FIG. 7 shows a scanning microscope according to the invention with a first light source 49 that emits an excitation light beam 51. The first light source 49 is implemented as a pulse laser 53, in particular as a pulsed diode laser. After passing through the excitation pinhole aperture 55. the excitation light beam 51 strikes the main beam splitter 57. which directs the excitation light beam 51 to the beam splitter 59, which comprises a cardanically hung scanning mirror 61. The scaniiinu microscope comprises a second light source 63, which is formed as a mode-coupled titanium sapphire laser 65, to which the first light source 49 is synchronized. The second light source 63 emits a light beam 19 which will hereafter be designated the stimulation light beam 67. The stimulation light beam 67 strikes a phase filter 69, which is formed analogous to the phase filter depicted in FIG. 1. The phase filter consists of a glass prism 3 and exhibits a first interface 9 and a second interface 15. The stimulation light beam 67 coming from the phase filter 69 is directed by a reflectitig mirror 71 to a dichroic beam splitter 73. The dichroic beam splitter 73 unites the excitation light beam 51 and the stimulation light beam 67 onto a common beam path. The stimulation light beam 67 is also directed by the main beam splitter 57 to the beam deflector 59. The beam deflector 59 conveys the excitation light beam 51 and the stimulation light beam 67 together through the scanning optic 75. the tube optic 77, and the focusing optic 49. that is. to the microscope objective 81 via or through the sample 83. The focus of the excitation light beam excites the sample optically in a sample point, while the focus of the stimulation light beam stimulates de-excitation of an external region of the excited region of the sample. To this end. the focus of the stimulation light beam is suitably formed as an internally hollow focus. The phase filter 69 in this variant is arranged on a conjugated plane (Fourier plane) to the focal plane of the microscope objective 81. The detection light 85 coming from the sample reaches the beam deflector via the microscope objective 81, the tube optic 77. and the scanning optic 75. from which it passes the main beam splitter and the downstream detection aperture 87. after which it finally reaches the detector 89. which is implemented as a multiband detector 91. The detector generates electrical signals that are proportional to the power of the detection light 85. which is conveyed for the purpose of imaging together with the positional signals of the beam deflector 59 to a processing unit that is not shown.

The scanning microscope shown can be operated with samples having various characteristics because it is easily adjustable for different stimulation wavelengths.

The invention is advantageously characterized by the following features. The second material of the optical device has a coating on the first material. The second material contains a metal. The second material can comprise a metallic coating. The first material consists of glass and/or transparent plastic and/or a crystal. The first material forms a three-dimensional geometric figure, in particular a prism or a rhomboid or a cuboid. A part of one surface of the three-dimensional geometric figure borders the second material, and another part of the surface borders the third material.

Further interfaces are envisaged, as is that the further interfaces reflect the light beam or parts of the light beam.

The focus formed is a hollow focus. The focus formed exhibits an annular form.

The optical device is used in scanning microscopy, in particular in STED microscopy or up-conversion-depletion microscopy or 4-pi microscopy.

While this invention has been particularly shown and described with references to preferred embodiments thereof, it will be understood by those skilled in the art that various changes in form and details may be made therein without departing from the scope of the invention encompassed by the appended claims.

What is claimed is:

1. An optical device comprising:
   a means for creating a phase shift between a central part of a light beam and a peripheral part of the light beam, comprising:
   a first interface and
   a second interface,
   wherein the first interface reflects the central part of the light beam,
   wherein the second interface reflects the peripheral part of the light beam,
   wherein the first interface is an interface between a first material and a second material,
   wherein the second interface is an interface between the first material and a third material, and
   wherein a refractive index transition at the first interface differs from a refractive index transition at the second interface, the difference resulting in the phase shift.

2. The optical device according to claim 1, wherein the reflection of the central or the peripheral part of the light beam is a total reflection.

3. The optical device according to claim 1, wherein the first material or the second material or the third material has a low dispersion.

4. The optical device according to claim 3, wherein the third material is a gas or a gas mixture.

5. The optical device according to claim 1, wherein the phase shift is largely independent of the wavelength $\lambda$, and wherein the phase shift is approximately $\lambda/2$ or $\lambda/4$.

6. The optical device according to claim 1, wherein the light beam has several wavelengths, and wherein the phase shift for each wavelength $\lambda$ is $\lambda/2$ or $\lambda/4$.

7. The optical device according to claim 1, wherein the light beam is s-polarized with regard to the reflection.

8. The optical device according to claim 1, wherein the reflection at the first interface occurs at the same angle as the reflection at the second interface and the phase shift can be adjusted by changing the angle of reflection.

9. The optical device according to claim 8, further comprising a rotational device to rotate or swivel the first material and the second material.

10. The optical device according to claim 9, wherein the first material, the second material, or the third material exhibit has a substructure.

11. A scanning microscope comprising:
a means for creating a phase shift between a central part of the a light beam and a peripheral part of the light beam, comprising:
a first interface and
a second interface,
wherein the first interface reflects the central part of the light beam,
wherein the second interface reflects the peripheral part of the light beam,
wherein the first interface is an interface between a first material and a second material,
wherein the second interface is an interface between the first material and a third material, and
wherein a refractive index transition at the first interface differs from a refractive index transition at the second interface, the difference resulting in the phase shift.

12. The scanning microscope according to claim 11, wherein the reflection of the second the central or the peripheral part of the light beam is a total reflection.

13. The scanning microscope according to claim 12, wherein the second material is a coating on the first material.

14. The scanning microscope according to claim 11, wherein the first material or the second material or the third material has a low dispersion.

15. The scanning microscope according to claim 11, wherein the third material is a gas or a gas mixture.

16. The scanning microscope according to claim 11, wherein the light beam is s-polarized with regard to the reflection.

17. The scanning microscope according to claim 11, wherein the reflection at the first interface occurs at the same angle as the reflection at the second interface and the phase shift is adjustable by changing the angle of reflection.

18. The scanning microscope according to claim 11, wherein the scanning microscope optically excites a sample in a region of the sample with an excitation light beam.

19. The scanning microscope according to claim 18, wherein the light beam generates stimulated emission in the excited region of the sample or in a part of the excited region of the sample.

20. The scanning microscope according to claim 18, wherein the light beam generates a further excitation of the sample.

21. A phase filter creating a phase shift between a central part of a light beam and a peripheral part of a light beam, comprising:
a first interface and
a second interface,
wherein the first interface reflects the central part of the light beam. and
wherein the second interface reflects the peripheral part of the light beam,
wherein the first interface is an interface between a first material and a second material,
wherein the second interface is an interface between the first material and a third material, and
wherein a refractive index transition at the first interface differs from a refractive index transition at the second interface, the difference resulting in the phase shift.

22. The phase filter according to claim 21, wherein the reflection of the central or the peripheral part of the light beam is a total reflection.

23. The phase filter according to claim 21, wherein the second material is a coating on the first material.

24. The phase filter according to claim 21, wherein the first material has a low dispersion.

25. The phase filter according to claim 21, wherein the first material forms a three-dimensional geometric figure, a prism, or rhomboid, or a cuboid.

26. The phase filter according to claim 25, wherein one part of a surface of the three-dimensional geometric figure borders the second material, and another part of the surface borders the third material.

27. The phase filter according to claim 21, wherein the third material is a gas or a gas mixture.

28. The phase filter according to claim 21, wherein the phase shift is largely independent of the wavelength $\lambda$, and wherein the phase shift is approximately $\lambda/2$ or $\lambda/4$.

29. The phase filter according to claim 21, wherein the light beam exhibits several wavelengths, and wherein the phase shift for each wavelength $\lambda$ is $\lambda/2$ or $\lambda/4$.

30. The phase filter according to claim 21, wherein the reflection at the first interface occurs at the same angle as the reflection at the second interface and the phase shift is adjustable by changing the angle of reflection.

31. The phase filter according to claim 30, further comprising a rotational device to rotate or swivel the first material and the second material.

* * * * *